United States Patent [19]
Kohno

[11] Patent Number: 5,997,131
[45] Date of Patent: *Dec. 7, 1999

[54] RECORDING APPARATUS AND METHOD WITH SMOOTHING FUNCTION

[75] Inventor: Tetsushi Kohno, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/542,787

[22] Filed: Oct. 13, 1995

[30] Foreign Application Priority Data

Oct. 19, 1994 [JP] Japan .................................. 6-253676

[51] Int. Cl.$^6$ ................ B41J 2/145; B41J 2/15; B41J 29/38; H04N 1/21; H04N 1/23
[52] U.S. Cl. .................. 347/40; 347/5; 358/298
[58] Field of Search ................... 347/40, 19, 5, 347/9; 358/447, 451, 298; 395/117

[56] References Cited

U.S. PATENT DOCUMENTS

| | | | |
|---|---|---|---|
| 4,878,126 | 10/1989 | Ichikawa | 358/451 |
| 5,440,407 | 8/1995 | Overton | 358/447 |
| 5,440,410 | 8/1995 | Sugishima | 358/502 |
| 5,587,728 | 12/1996 | Edgar | 347/19 |
| 5,706,414 | 1/1998 | Pritchard | 395/117 |

FOREIGN PATENT DOCUMENTS 488534  6/1992  European Pat. Off. .

*Primary Examiner*—N. Le
*Assistant Examiner*—Thinh Nguyen
*Attorney, Agent, or Firm*—Fitzpatrick, Cella, Harper & Scinto

[57] ABSTRACT

When recording original data having a size greater than the height of a recording head, high-quality recording can be performed without unnatural connecting portions by performing smoothing processing for the original data. The original data is divided so as to have a size smaller than the height of the recording head, in such a manner that parts of divided data overlap with each other.

18 Claims, 8 Drawing Sheets

BY PERFORMING SMOOTHING PROCESSING WHILE ALSO
DEVELOPING DATA OF EXTRA DOTS PRESENT IN THESE REGIONS,
SMOOTHING PROCESSING IS PERFORMED ALSO FOR
CONNECTING PORTIONS BETWEEN PATHS,
THEREBY PROVIDING BETTER-LOOKING CONNECTION PORTIONS

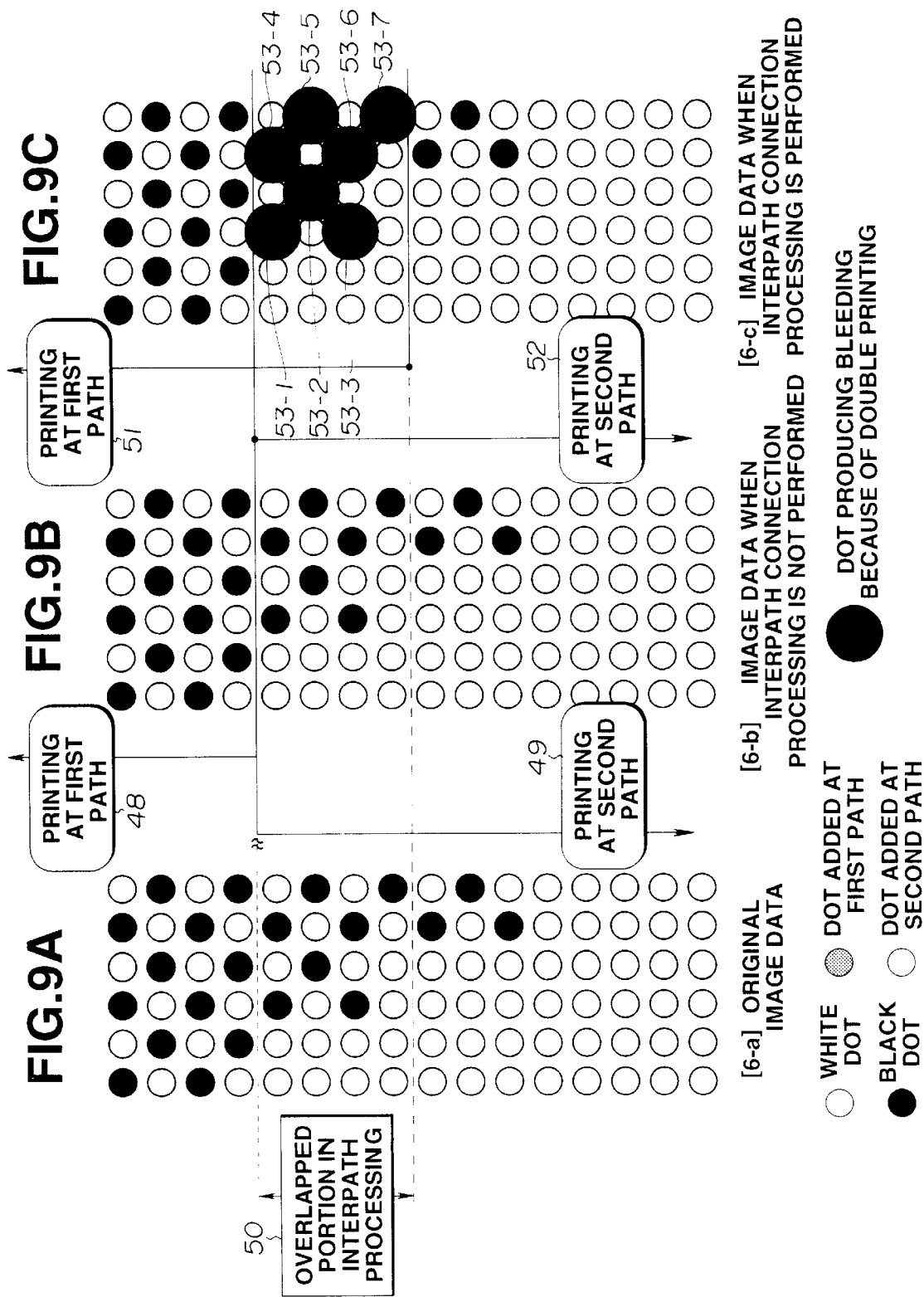

RECORDING APPARATUS AND METHOD WITH SMOOTHING FUNCTION

BACKGROUND OF THE INVENTION

1. Field of the Invention

This invention relates to a recording apparatus and method having a smoothing function of virtually improving resolution, improving jagged portions, and improving the quality of recording.

2. Description of the Related Art

A conventional recording apparatus having the smoothing function includes a printing buffer, used when performing smoothing processing, for storing more data than data covering the width (height) of a recording head. When recording a character exceeding the width (height) of a print head, such as an enlarged character or the like, smoothing processing is performed in consideration of the connecting portions, each extending over a plurality of recording paths or scans. For that purpose, a printing buffer for storing more data than data covering the width (height) of a recording head is required, and a large memory capacity is required.

In a method in which such an extra memory capacity is not required, a printing buffer is provided for each band width (height) covering the width (height) of a recording head, and smoothing processing is performed for each band width (height).

In this method, however, since data of a lower portion cannot be taken into consideration for a portion extending over bands (paths), connecting portions look unnatural in an enlarged character, such as a double-height character or the like, so that the quality of the character is, in some cases, partially degraded as a result of smoothing processing.

SUMMARY OF THE INVENTION

It is an object of the present invention to provide a recording apparatus capable of obtaining a high-quality result of smoothing recording such that connecting portions do not look unnatural even in an enlarged character having portions extending over plural paths, such as a double-height character or the like, without requiring a large amount of extra memory capacity.

In order to achieve the above-described object, the present invention relates to a recording apparatus for performing smoothing processing for each band width, comprising division means for dividing character data into data having a predetermined height within the band width when recording a character having a size exceeding the band width, and recording means for recording the divided character data.

The recording apparatus further comprises image processing means for performing smoothing processing while also developing a predetermined number of dots in a connecting portion of character data of a lower portion of a character to be recorded at the next path within a band so as not to exceed the band width.

The image processing means prohibits developing the predetermined number of dots in the connecting portion of the character data of the lower portion of the character to be recorded at the next path within the band when draft recording is assigned even if smoothing processing is set.

The image processing means prohibits developing the predetermined number of dots in the connecting portion of the character data of the lower portion of the character to be recorded at the next path within the band when recording a thinned character pattern even if smoothing processing is set.

The image processing means prohibits smoothing processing when draft recording is assigned even if smoothing processing is set.

The image processing means prohibits smoothing processing when recording a thinned character pattern even if smoothing processing is set.

In the recording apparatus for performing smoothing processing for each band width (height), when recording a character having a size exceeding the band width (height), the character is divided into portions having the predetermined height within the band width (height), and the divided portions are recorded. In the recording apparatus, smoothing processing is performed while also developing the predetermined number of dots in a connecting portion of character data, such as bit-map data, of a lower portion of a character to be recorded at the next path within a band so as not to exceed the band width (height).

At that time, since the predetermined number of dots in a connecting portion between paths are scanned twice, double printing is performed. Hence, in a thinned character having low resolution, such as a draft character or the like, the print density increases in double-printed portions such that the portions can be easily noticed, and the quality of the character is rather degraded as a result of the above-described operation. Accordingly, when processing a thinned character having low resolution, such as a draft character or the like, processing for connecting portions between paths is not performed.

As a result, when adding a smoothing function, it is possible to smoothly perform processing for connecting portions even if smoothing processing is performed for an enlarged character having portions extending over plural paths, such as a double-height character or the like, without adding a memory for processing for connecting portions, and to perform smoothing processing without degrading the quality of the character.

When processing a thinned character having low resolution, such as a draft character or the like, double printing of connecting portions between paths is prevented by not performing processing for the connecting portions, and an excellent result of printing is obtained without degrading the quality of the character.

According to a first aspect of the present invention, a recording apparatus for recording with a recording head having a predetermined height includes development means for developing recording data obtained by dividing input data in such a manner that parts of the divided input data overlap with each other, when the input data has a size exceeding the height of the recording head, processing means for performing smoothing processing for the recording data developed by the development means, and recording controlling means for controlling recording of the recording data subjected to the smoothing processing by the processing means.

According to another aspect of the present invention, a recording method for recording with a recording head having a predetermined height includes the steps of developing recording data obtained by dividing input data in such a manner that parts of the divided input data overlap with each other, when the input data has a size exceeding the height of the recording head, performing smoothing processing for recording data developed in the developing step, and recording the recording data subjected to the smoothing processing in the processing step.

According to a further aspect of the present invention, a recording apparatus for recording on a recording medium with a recording head having a predetermined height includes means for receiving input data, including oversize input data representing characters or images having a height greater than the height of the recording head, means for dividing the oversize input data into plural swaths of recording data having heights less than the height of the recording head, with each pair of adjacent swaths being joined at a boundary portion, and means for selectively smoothing the boundary portions of the divided recording data, wherein in smoothing recording data of a boundary portion of adjacent swaths, smoothing data is added to the end of the divided recording data of a first swath of the adjacent swaths.

According to yet a further aspect of the present invention, a recording method for recording on a recording medium with a recording head having a predetermined height includes the steps of receiving input data, including oversize input data representing characters or images having a height greater than the height of the recording head, dividing the oversize input data into plural swaths of recording data having heights less than the height of the recording head, with each pair of adjacent swaths being joined at a boundary portion, and selectively smoothing the boundary portions of the divided recording data, wherein in smoothing recording data of a boundary portion of adjacent swaths, smoothing data is added to the end of the divided recording data of a first swath of the adjacent swaths.

The foregoing and other objects, advantages and features of the present invention will become more apparent from the following description of the preferred embodiment taken in conjunction with the accompanying drawings.

BRIEF DESCRIPTION OF THE DRAWINGS

FIGS. 9A–9C are diagrams illustrating original image data, results of image printing with smoothing processing when processing for connecting portions between paths is not performed, and results of image printing with smoothing processing when processing for connecting portions between paths is performed, respectively, for a draft (thinned) character in the other embodiment.

DESCRIPTION OF THE PREFERRED EMBODIMENTS

A preferred embodiment of the present invention will now be described in detail with reference to the drawings.

Before describing the present invention, a description will be provided of a recording apparatus to which the present invention is applied.

Figure 2:
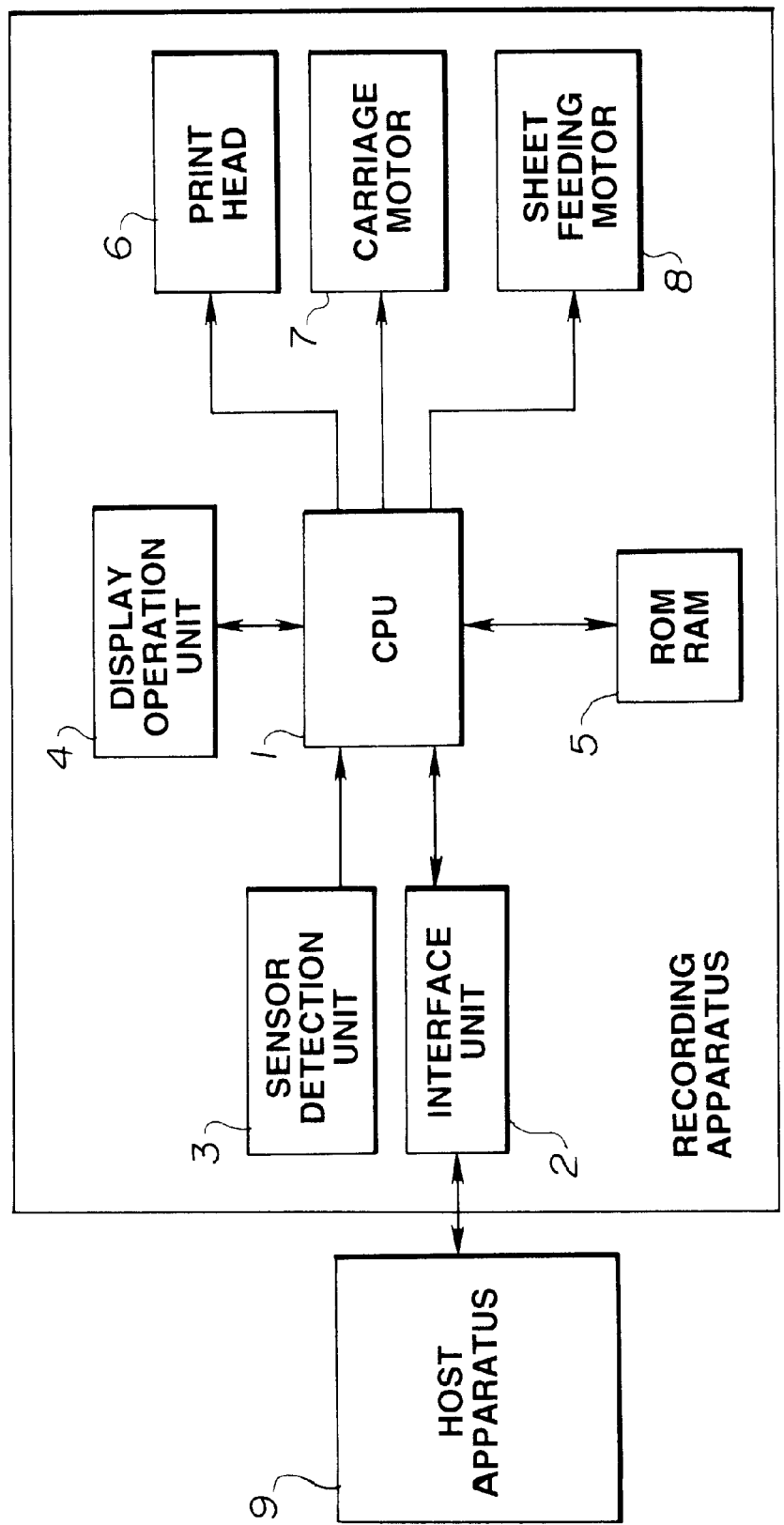
FIG. 2 is a block diagram illustrating a control system of the recording apparatus of the embodiment.

FIG. 2 is a block diagram of a control system of the recording apparatus.

In FIG. 2, a central processing unit (CPU) 1 is connected to a host apparatus 9, such as the main body of a computer, a word processor or the like, via an interface unit 2 so that data can be transmitted and received via various kinds of signal lines.

A sensor detection unit 3, comprising sensors necessary for detecting a carriage position, temperature, the presence/absence of a sheet, and the like, a display operation unit 4, on which display lamps, various kinds of operational switches and the like are disposed, and a storage unit 5, including a ROM (read-only memory) for storing programs relating to flowcharts (to be described later), and the like, and a RAM (random access memory), are connected to the CPU 1.

Control programs, a CG (character generator) and the like are stored in the ROM. The RAM includes a reception buffer for temporarily storing data transferred from the host apparatus 9, and a printing buffer for developing received data into data to be actually printed and temporarily storing the data. The CPU 1 controls an ink-jet print head 6, a carriage motor 7, a sheet feeding motor 8 and the like based on various kinds of data detection signals which have been input.

Figure 1:
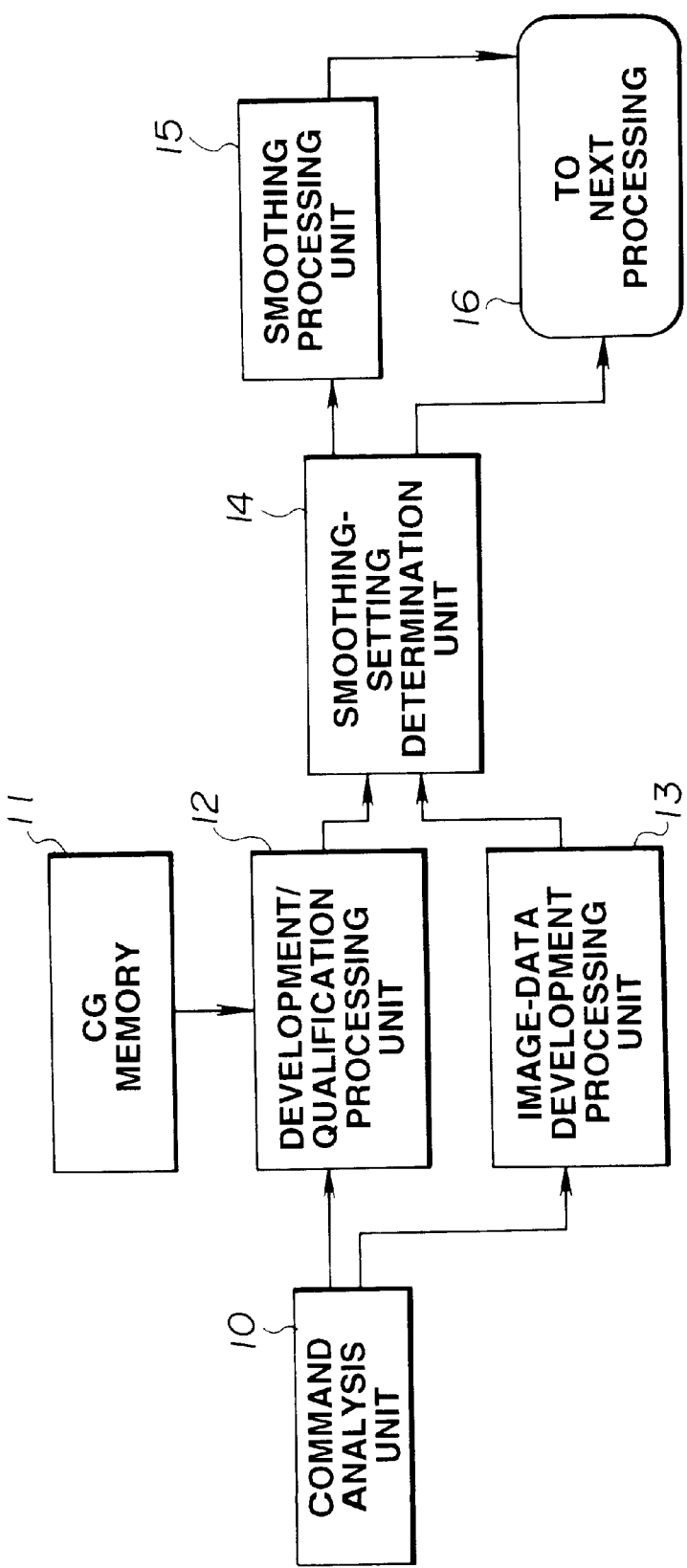
FIG. 1 is a functional block diagram illustrating printing data processing in a recording apparatus according to an embodiment of the present invention.

FIG. 1 is a functional block diagram illustrating printing data processing in the recording apparatus of the embodiment. The functions of the processing blocks shown in FIG. 1 are mainly executed by the CPU 1 and ROM—RAM 5 shown in FIG. 2. Data input from the host apparatus 9 shown in FIG. 2 is analyzed by a command analysis unit 10. If the input data is character data, data is read from a CG memory 11, and a development/qualification processing unit 12 develops the read data into bit-map data in the printing buffer within the RAM. If the input data is image data, an image-data development processing unit 13 develops the image data in the printing buffer within the RAM. Then, a smoothing-setting determination unit 14 determines if smoothing processing is set. If smoothing processing is set, a smoothing processing unit 15 performs smoothing processing of the data developed in the printing buffer, and the process proceeds to the next processing 16. If smoothing processing is not set, smoothing processing is not performed, and the process proceeds to the next processing 16.

Figure 3:
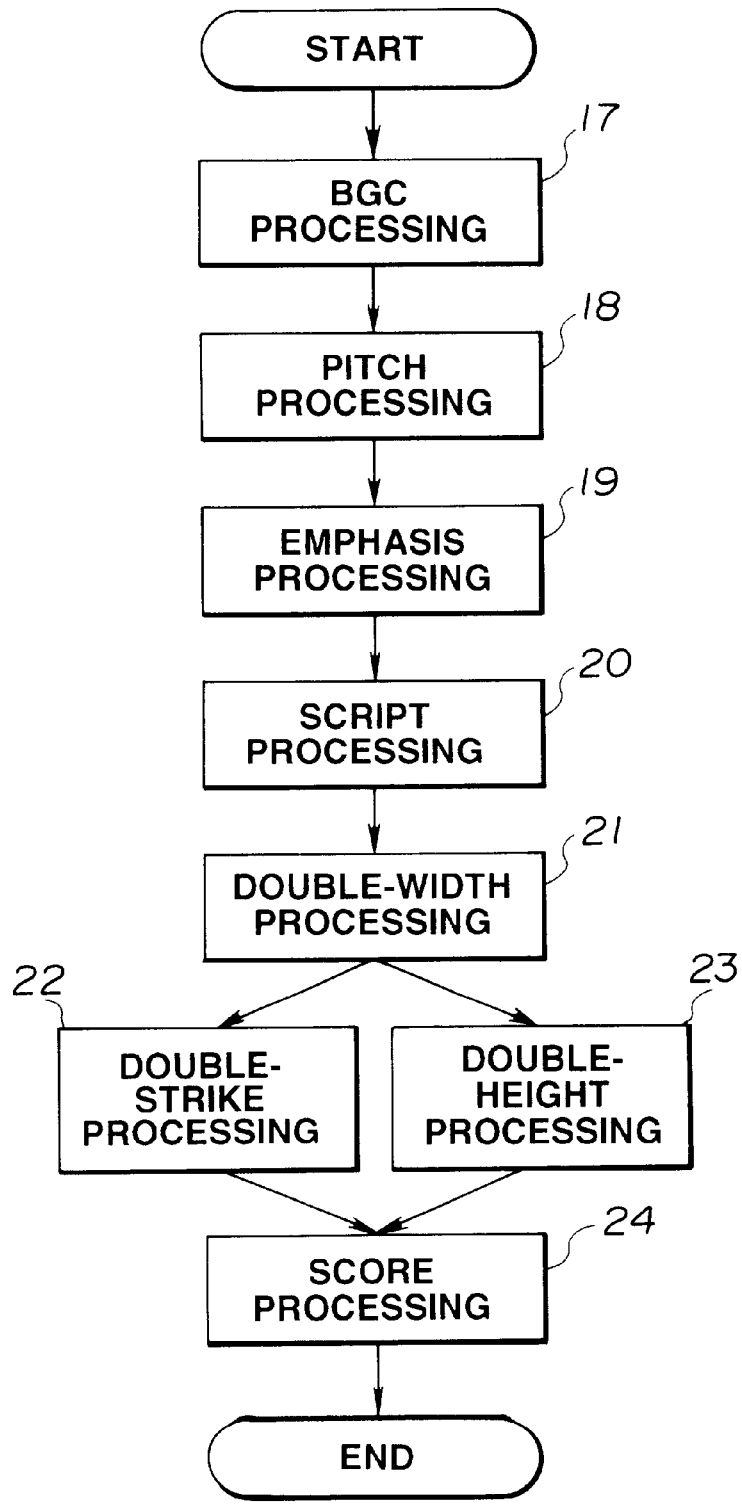
FIG. 3 is a flowchart illustrating development and qualification processing of character data in the recording apparatus of the embodiment.

FIG. 3 illustrates the contents of development and qualification processing of character data executed by the development/qualification processing unit 12. If the data read from the CG memory 11 is data of BGC's (block graphic characters, which have a greater size (having a height of 60dots with 10 cpi (characters per inch)) than that of ordinary characters (having a height of 48 dots with 10 cpi) in the direction of the height, and which have an entirely black pattern, a screen pattern or a line pattern), BGC processing 17 is performed. Then, pitch processing 18, in which data is adjusted to the character pitch that is currently set, is performed. Thereafter, if setting of emphasized characters to thicken characters by two dots in the horizontal direction is provided, emphasis processing 19 for data is performed. Thereafter, if setting of script characters is provided, script processing 20 is performed. Thereafter, if setting of double-width characters is provided, double-width processing 21 for data is performed. Thereafter, if setting of double-striking of characters is provided, double-strike processing 22, in which data is thickened by one dot in the vertical direction, is performed. Alternatively, if setting of double-height characters is provided, double-height processing 23 for data is performed. Thereafter, if setting of score characters having underlines, overlines or the like, is provided, score processing 24 is performed.

Figure 4:
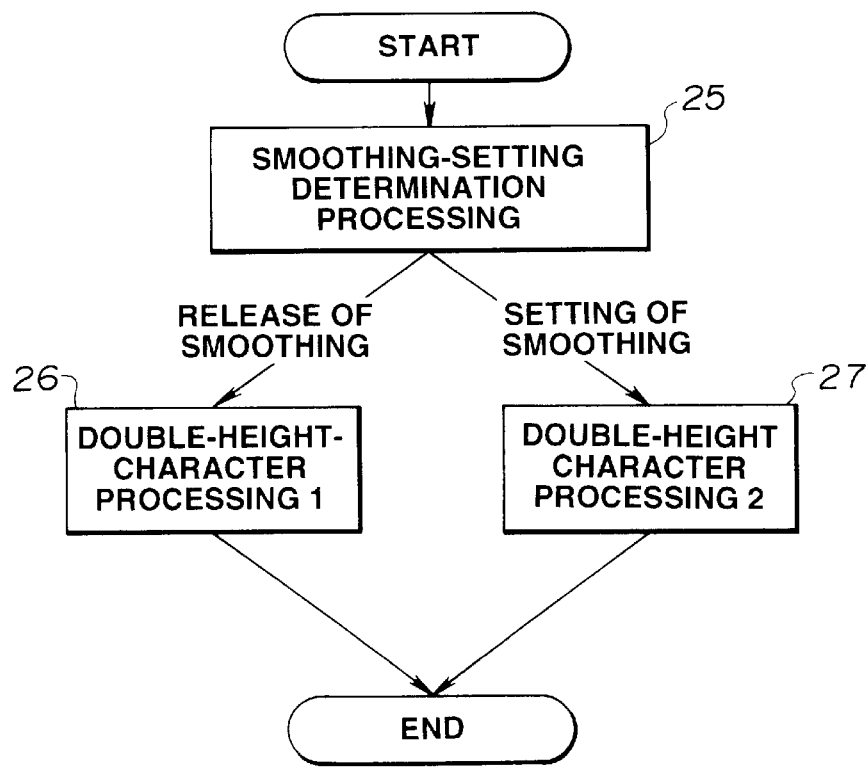
FIG. 4 is a flowchart illustrating development and qualification processing when double-height characters are set in the recording apparatus of the embodiment.

FIG. 4 illustrates development and qualification processing when setting of double-height characters is provided in the recording apparatus of the embodiment. When setting of double-height characters is provided, smoothing-setting determination processing 25 is performed. If setting of smoothing is not provided, double-height-character setting processing (1) with ordinary characters 26 is performed. If setting of smoothing is provided, double-height-character setting processing (2) with smoothing characters 27 is performed.

Figure 5:
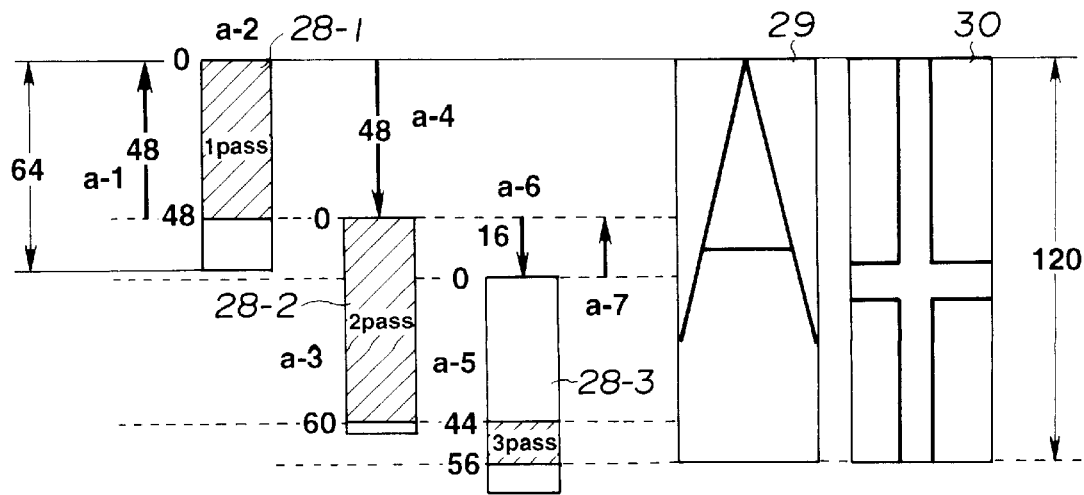
FIG. 5 is a diagram illustrating the contents of printing processing of double-height characters when setting of smoothing is not provided in the recording apparatus of the embodiment.

FIG. 5 illustrates the contents of printing processing of double-height characters when smoothing setting is not provided in the recording apparatus of the embodiment. When the height of the print head is smaller than the height of a character to be recorded, the character cannot be printed in a single printing operation (path, swath or scan). Hence, printing is performed by dividing the printing operation into a plurality of paths. In the present embodiment, the heights 28-1, 28-2 and 28-3 (and heights 31-1, 31-2 and 31-3 in FIG. 6) of the head at respective positions equal 64 dots, while the maximum height of double-height characters equals 120 dots. In the present embodiment, a double-height character is recorded by dividing the printing operation into two or three paths. FIG. 5 illustrates the process and results of printing of double-height characters when smoothing setting is released. In FIG. 5, the recording sheet is first subjected to reverse feeding by a distance equal to 48 dots a-1 from the current head position (the position when printing a normal-height character).

Then, data of the upper 48 dots of an enlarged printing character is developed within the printing buffer for storing data covering the height (64 dots) of the head, and printing of the first path a-2 is performed. This is for printing a normal-height character at the next path. Then, sheet feeding by 48 dots in the forward direction a-4 is executed. Then, data of dots from the 49-th dot to the 108-th dot from the upper position of the character (which corresponds to the maximum height of the normal-height character) is developed in the printing buffer, and printing of the second path a-3 is performed. Then, sheet feeding by 16 dots in the forward direction a-6 is executed. This is for reducing the amount of sheet feeding when performing printing of the next line. Then, data of dots from the 109-th dot to the 120-th dot from the upper position of the character is developed in the printing buffer, and printing of the third path a-5 is performed. Then, sheet feeding by 16 dots in the reverse direction a-7 is executed in order to prepare for the next requested operation. By performing the above-described print-head operation, recording of double-height characters as indicated by reference numerals 29 and 30 is completed.

Figure 6:
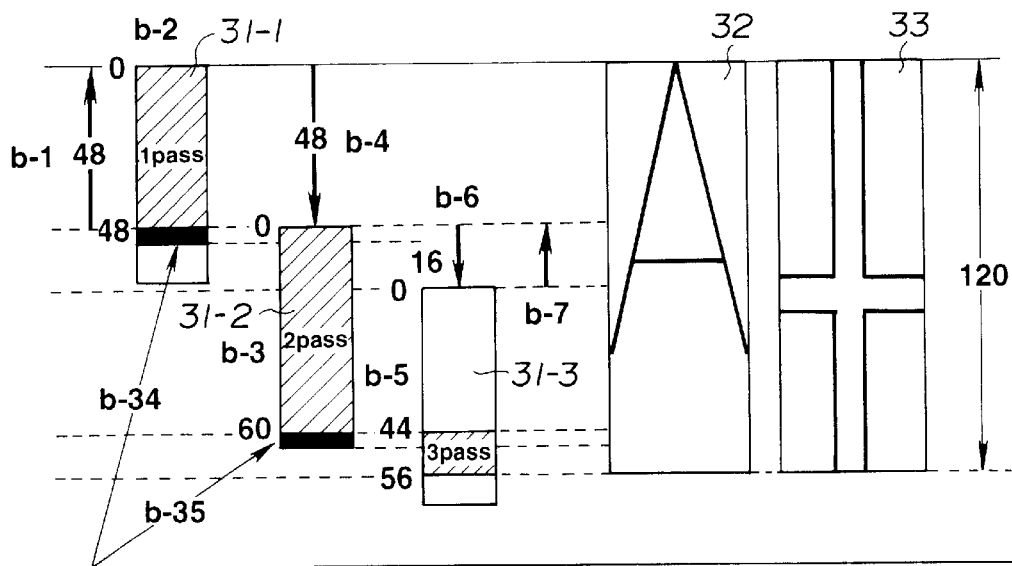
FIG. 6 is a diagram illustrating the contents of printing processing of double-height characters when setting of smoothing is provided in the recording apparatus of the embodiment.

Next, a description will be provided of a method of printing double-height characters when setting of smoothing is provided. FIG. 6 illustrates a method of printing double-height characters when setting of smoothing is provided. First, the sheet is subjected to reverse feeding b-1 by 48 dots from the current head position. Then, data of the upper 52 dots of an enlarged character to be printed is developed in the printing buffer for storing data covering the height (64 dots) of the head, smoothing processing is performed, and printing of the first path b-2 is performed. Printing of the first path b-2 includes printing image data and smoothing data from the first dot to the 48-th dot, but only printing smoothing data from the 49-th dot to the 52-nd dot. Then, sheet feeding by 48 dots in the forward direction b-4 is executed. Then, data of dots from the 49-th dot to the 112-th dot from the upper position of the enlarged character is developed in the printing buffer, smoothing processing is performed, and printing of the second path b-3 is performed. Then, sheet feeding by 16 dots in the forward direction b-6 is executed. Printing of the second path b-4 includes printing image data and smoothing data for dots from the 49-th dot to the 108-th dot, but printing only smoothing data from the 109-th dot to the 112-th dot. Then, data of dots from the 109-th dot to the 120-th dot from the upper position of the enlarged character is developed in the printing buffer, smoothing processing is performed, and printing of the third path b-5 is performed. Then, sheet feeding by 16 dots in the reverse direction b-7 is executed in order to prepare for the next requested operation. By performing the above-described print-head operation, recording of double-height characters as indicated by reference numerals 32 and 33 is completed. By performing smoothing processing while also developing data of extra dots (b-34 and b-35) present in connecting portions between paths, smoothing processing is performed while reflecting dot information relating to a portion lower than the connecting portion.

Although in the present embodiment, smoothing processing is performed within the printing buffer, the original image may be developed in a working buffer, and may be developed in a printing buffer after performing smoothing processing.

Figure 7:
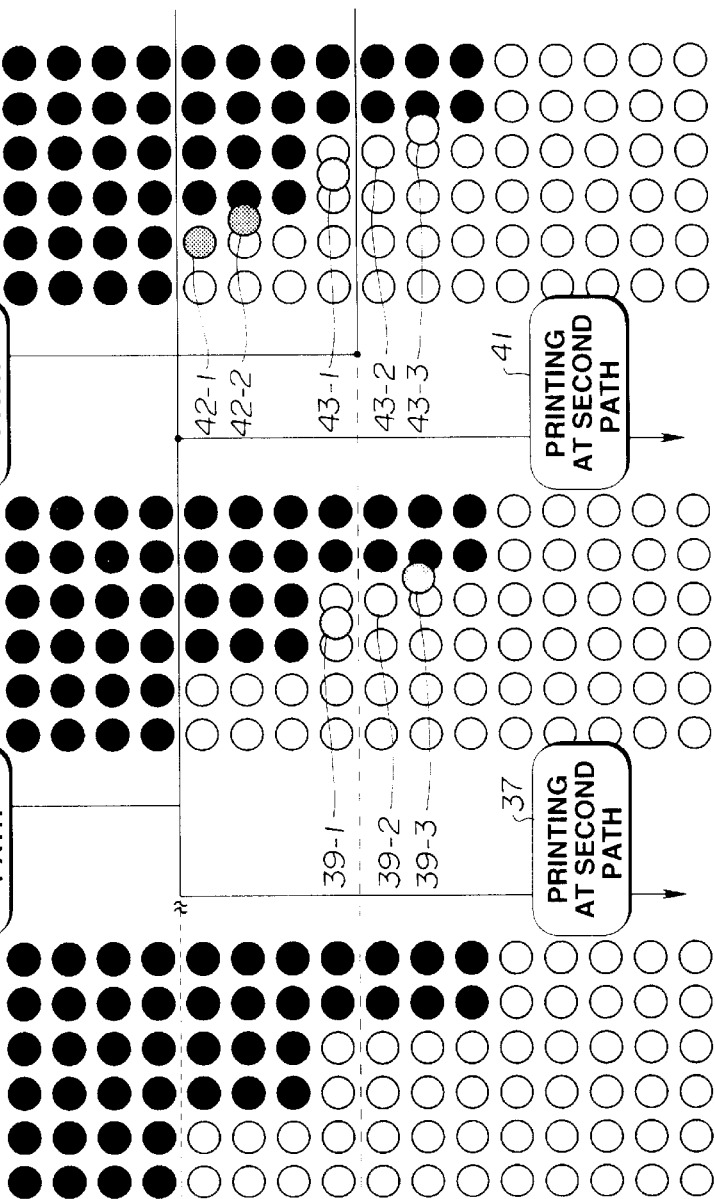
FIGS. 7A–7C are diagrams illustrating original image data, results of image printing with smoothing processing in which processing for a connecting portion between paths is not performed, and results of image printing with smoothing processing in which processing for a connecting portion between paths is performed, respectively, in the recording apparatus of the embodiment.

FIGS. 7A–7C illustrate obtained images in smoothing processing both when interpath connection processing is not performed (FIG. 7B) and is performed (FIG. 7C) in the present embodiment. When smoothing processing is performed for original image data shown in FIG. 7A, in the case of FIG. 7B in which interpath connection processing is not performed, since data of dots to be printed in the next path 37 is not taken into consideration in printing the first path 36, smoothing processing is not performed in the vicinity of a boundary portion 38 adjacent the boundary of printing in the first path and printing in the second path. In printing the second path 37, dots 39-1, 39-2 and 39-3 are added for smoothing. In the case of FIG. 7C in which interpath connection processing is performed, since data of dots to be printed at the next path is taken into consideration, smoothing processing is performed in the vicinity of the boundary portion 38 (corresponding to the amount of overlap in interpath processing), and dots 42-1 and 42-2 are added in printing the first path 40. In printing at the second path 41, dots 43-1, 43-2 and 43-3 are added for smoothing. Thus, smoothing processing is performed for the connecting portion between the paths, so that the quality of the character is improved.

In the present embodiment, when performing smoothing processing, dots are printed at positions between ordinary dots by halving the speed of the carriage in the scanning direction.

Second Embodiment

Figure 8:
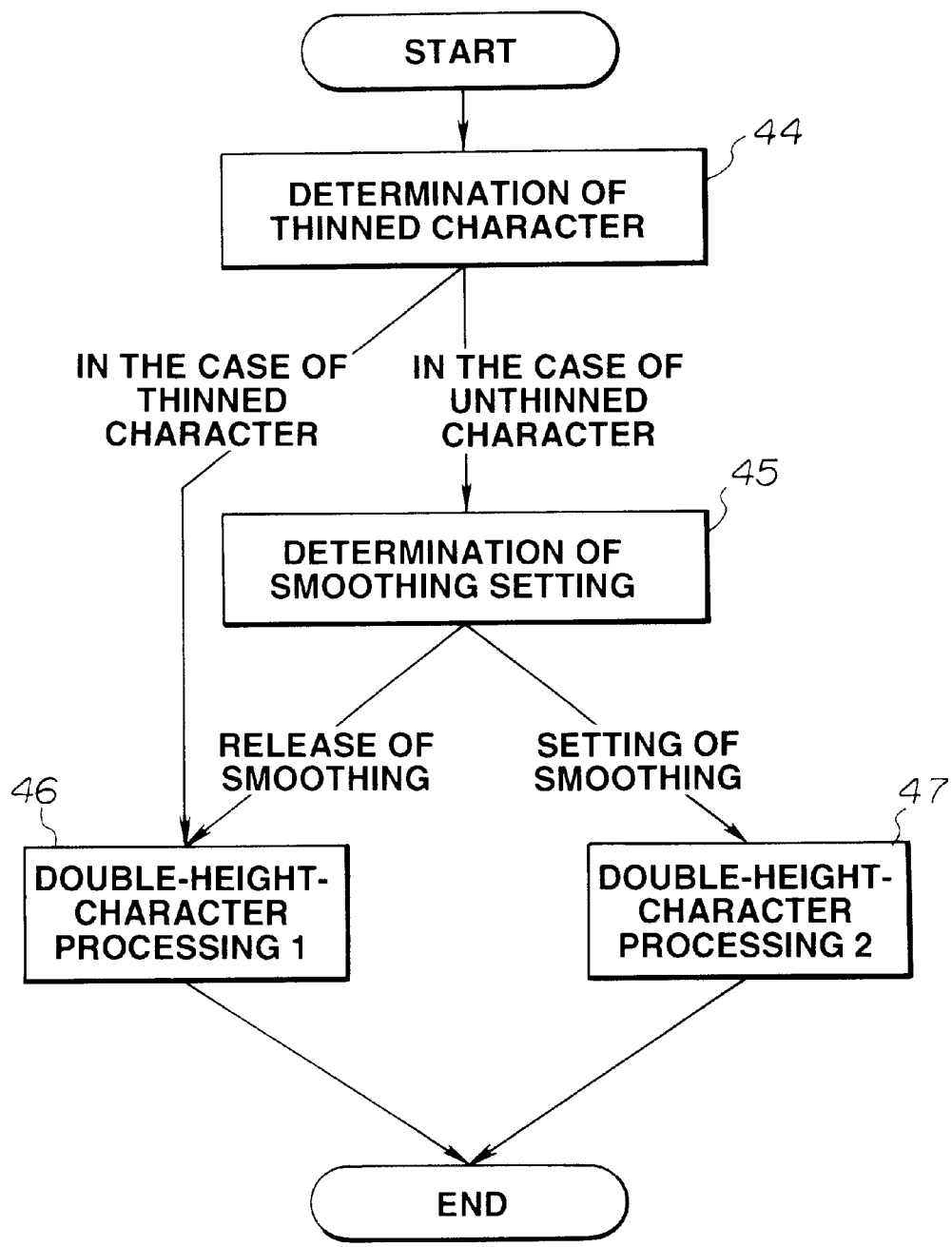
FIG. 8 is a flowchart printing processing procedures of a double-height character in the case of a thinned character according to another embodiment of the present invention.

FIG. 8 illustrates printing processing procedures for a double-height character of a thinned character. First, it is determined if the concerned character is a thinned character comprising a smaller number of dots (44). If the character is not a draft (thinned) character, it is then determined if setting of smoothing is provided (45). If setting of smoothing is provided, double-height-character processing 47, in which connecting portions between paths are taken into consideration, is performed. If setting of smoothing is released, ordinary double-height-character processing 46, in which connecting portions between paths are not taken into consideration, is performed. If the character is a draft (thinned) character, the ordinary double-height-character processing 46 is performed.

FIGS. 9A–9C illustrate obtained images in smoothing processing when interpath connection processing is not performed (FIG. 9B) and is performed (FIG. 9C) for a draft (thinned) character in the second embodiment. Even if smoothing processing is performed for original image data of a draft (thinned) character shown in FIG. 9A, no additional dot is provided in the resultant image data of FIG. 9B, because the image data does not have a pattern subjectable to smoothing processing. Accordingly, the obtained image data has the same quality as the original image 8-a. That is, in the case of FIG. 9B in which interpath connection processing is not performed, since data of dots to be printed in the next path 49 is not taken into consideration in printing the first path 48, the same result of printing is obtained for the draft (thinned) character even if smoothing processing is not performed in the vicinity of a boundary portion 50 adjacent the boundary of printing the first path and printing the second path. Since there is no overlapped portion 50 in interpath processing in printing the first path and in printing the second path, there is no double-printed dot. Hence, a partial increase in the print density which degrades the quality of printed characters does not occur. On the other hand, in the case of FIG. 9C in which interpath connection processing is performed, there is an overlapped portion 50 in interpath processing in printing the first path 51 and in printing the second path 52. Hence, the print density increases in the overlapped portion 50 due to double-printed dots 53-1, 53-2, 53-3, 53-4, 53-5, 53-6 and 53-7 in interpath processing, thereby degrading the quality of printed characters. Degradation in the quality of printed characters caused by variations in the print density due to double printing can be prevented by not performing interpath connection processing when printing of draft characters is desired.

In addition to the above-described embodiments, the following approaches may be executed.

1) When setting of draft characters is provided, smoothing processing as well as interpath connection processing are not performed, since the same result of printing is obtained even if smoothing processing is not performed.

2) When printing a thinned pattern within a block graphic character (BCG), smoothing processing as well as interpath connection processing are not performed, since the same result of printing is obtained even if smoothing processing is not performed.

As is apparent from the foregoing description, according to the present invention, it is possible to achieve high-quality smoothing recording which does not provide unnatural connecting portions even in an enlarged character extending over plural paths, such as a double-height character or the like, without requiring a large amount of extra memory capacity.

According to the present invention, by prohibiting smoothing processing for a character whose quality is not improved even by performing smoothing processing, smoothing processing can be omitted, thereby causing an increase in the speed of program processing and an increase in the printing speed.

The individual components designated by blocks in the drawings are all well known in the recording apparatus and method arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A recording apparatus comprising:

recording means for performing recording with a recording head having a predetermined width;

storing means for storing data to be recorded by said recording head, wherein said storing means has a width not exceeding the predetermined width of the recording head; and control means for storing data in said storing means for recording at a first path, performing smoothing of the data stored in said storing means for the first path, and controlling said recording means for recording smoothed data for the first path; and for storing data in said storing means for recording at a second path which overlaps data for the first path in part, performing smoothing of the data stored in said storing means for the second path, and controlling said recording means for recording smoothed data for the second path so that recorded data for the second path overlaps recorded data for the first path in part.

2. An apparatus according to claim 1, wherein said recording means comprises an ink-jet printer.

3. An apparatus according to claim 1, wherein a width of the data to be stored in said storing means is no more than a width of said recording head.

4. An apparatus according to claim 1, wherein, for recording a double-height-character, said control means stores the data for recording at the first path, performs smoothing of the stored data for the first path, and controls said recording means for recording the smoothed data for the first path, and stores the data for recording at the second path which overlaps the data for the first path in part, performs smoothing of the stored data for the second path, and controls said recording means for recording the smoothed data for the second path so that the recorded data for the second path overlaps the recorded data for the first path in part, and for recording a normal character, said control means stores the data for recording at the first path, performs smoothing of the stored data for the first path, and controls said recording means for recording the smoothed data for the first path, and stores the data for recording at the second path so that the data for the second path does not overlap the data for the first path, performs smoothing of the stored data for the second path, and controls said recording means for recording the smoothed data for the second path so that the recorded data for the second path does not overlap the recorded data for the first path in part.

5. A recording apparatus comprising:

recording means for performing recording with a recording head having a predetermined width;

storing means for storing data to be recorded by said recording head, wherein said storing means has a width not exceeding the predetermined width of the recording head; and control means for, in a first designated mode, storing data in said storing means for recording at a first path, performing smoothing of the data stored in said storing means for the first path, and controlling said recording means for recording smoothed data for the first path, and for storing data in said storing means for recording at a second path which overlaps the data for the first path in part, performing smoothing of the data stored in said storing means for the second path, and controlling said recording means for recording smoothed data for the second path so that recorded data for the second path overlaps recorded data for the first path in part, said control means further for, in a second designated mode, storing the data in said storing means for recording at the first path, performing smoothing of the data stored in said storing means for the first path, and controlling said recording means for recording the smoothed data for the first path, and for storing the data in said storing means for recording at the second path which does not overlap the data for the first path, performing smoothing of the data stored in said storing means for the second path, and controlling said recording means for recording the smoothed data for the second path so that the recorded data for the second path does not overlap the recorded data for the first path.

6. An apparatus according to claim 5, wherein the second mode is a draft mode.

7. An apparatus according to claim 5, wherein the second mode is a double-height-character recording mode.

8. A recording method which performs recording using recording means including a recording head having a predetermined width and storing means for storing data and having a width not exceeding the predetermined width of the recording head, said method comprising the steps of:

storing data in the storing means for recording at a first path, performing smoothing of the data stored in the storing means for the first path, and controlling the recording head for recording smoothed data for the first path; and storing data in the storing means for recording at a second path which overlaps data for the first path in part, performing smoothing of the data stored in the storing means for the second path, and controlling the recording head for recording smoothed data for the second path, so that recorded data for the second path overlaps recorded data for the first path in part.

9. A method according to claim 8, wherein the recording head comprises an ink-jet head.

10. A method according to claim 8, wherein in recording a double-height-character, said method stores the data for recording at the first path, performs smoothing of the stored data for the first path, and controls the recording head for recording the smoothed data for the first path, and stores the data for recording at the second path which overlaps the data for the first path in part, performs smoothing of the stored data for the second path, and controls the recording head for recording the smoothed data for the second path so that the recorded data for the second path overlaps the recorded data for the first path in part, and in recording a normal character, said method stores the data for recording at the first path, performs smoothing of the stored data for the first path, and controls the recording head for recording the smoothed data for the first path, and stores the data for recording at the second path so that the data for the second path does not overlap the data for the first path, performs smoothing of the stored data for the second path, and controls the recording head for recording the smoothed data for the second path so that the recorded data for the second path does not overlap the recorded data for the first path in part.

11. A recording method which performs recording using recording means including a recording head having a predetermined width and storing means for storing data and having a width not exceeding the predetermined width of the recording head, said method comprising the steps of:

in a first designated mode, storing data in the storing means for recording at a first path, performing smoothing of the data stored in the storing means for the first path, and controlling the recording head for recording smoothed data for the first path, and storing data in the storing means for recording at a second path which overlaps the data for the first path in part, performing smoothing of the data stored in the storing means for the second path, and controlling the recording head for recording smoothed data for the second path so that recorded data for the second path overlaps recorded data for the first path in part; and in a second designated mode, storing the data in the storing means for recording at the first path, performing smoothing of the data stored in the storing means for the first path, and controlling the recording head for recording the smoothed data for the first path, and for storing the data in the storing means for recording at the second path which does not overlap the data for the first path, performing smoothing of the data stored in the storing means for the second path, and controlling the recording head for recording the smoothed data for the second path so that the recorded data for the second path does not overlap the recorded data for the first path.

12. A method according to claim 11, wherein the second mode is a draft mode.

13. A method according to claim 11, wherein the second mode is a double-height-character recording mode.

14. A recording medium recorded by a recording method which performs recording using recording means including a recording head having a predetermined width and storing means for storing data and having a width not exceeding the predetermined width of the recording head, said method comprising the steps of:

storing data in the storing means for recording at a first path, performing smoothing of the data stored in the storing means for the first path, and controlling the recording head for recording smoothed data for the first path; and storing data in the storing means for recording at a second path which overlays data for the first path in part, performing smoothing of the data stored in the storing means for the second path, and controlling the recording head for recording smoothed data for the second path, so that recorded data for the second path overlaps recorded data for the first path in part.

15. A recording medium according to claim 14, wherein in recording a double-height-character, said method stores the data for recording at the first path, performs smoothing of the stored data for the first path, and controls the recording head for recording the smoothed data for the first path, and stores the data for recording at the second path which overlaps the data for the first path in part, performs smoothing of the stored data for the second path, and controls the recording head for recording the smoothed data for the second path so that the recorded data for the second path overlaps the recorded data for the first path in part, and in recording a normal character, said method stores data for recording at the first path, performs smoothing of the stored data for the first path, and controls the recording head for recording the smoothed data for the first path, and stores the data for recording at the second path so that the data for the second path does not overlap the data for the first path, performs smoothing of the stored data for the second path, and controls the recording head for recording the smoothed data for the second path so that the recorded data for the second path does not overlap the recorded data for the first path in part.

16. A recording medium recorded by a recording method which performs recording using recording means including a recording head having a predetermined width and storing means for storing data and having a width not exceeding the predetermined width of the recording head, said method comprising the steps of:

in a first designated mode, storing data in the storing means for recording at a first path, performing smoothing of the data stored in the storing means for the first path, and controlling the recording head for recording smoothed data for the first path, and storing data in the storing means for recording at a second path which overlaps the data for the first path in part, performing smoothing of the data stored in the storing means for the second path, and controlling the recording head for recording smoothed data for the second path so that recorded data for the second path overlaps recorded data for the first path in part; and in a second designated mode, storing the data in the storing means for recording at the first path, performing smoothing of the data stored in the storing means for the first path, and controlling the recording head for recording the smoothed data for the first path, and for storing the data in the storing means for recording at the second path which does not overlap the data for the first path, performing smoothing of the data stored in the storing means for the second path, and controlling the recording head for recording the smoothed data for the second path so that the recorded data for the second path does not overlap the recorded data for the first path.

17. A recording medium according to claim 16, wherein the second mode is a draft mode.

18. A recording medium according to claim 16, wherein the second mode is a double-height-character recording mode.

* * * * *